Dec. 8, 1970
T. F. ANGQUIST
3,545,312
REVERSIBLE CAM LOCK DRIVER
Filed Nov. 6, 1968
2 Sheets-Sheet 1
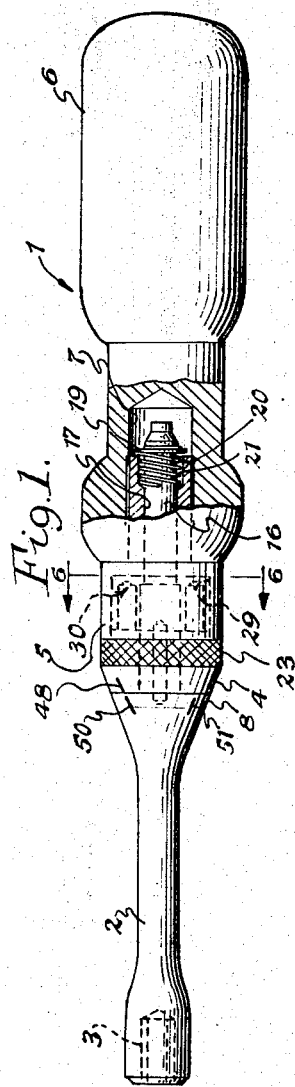
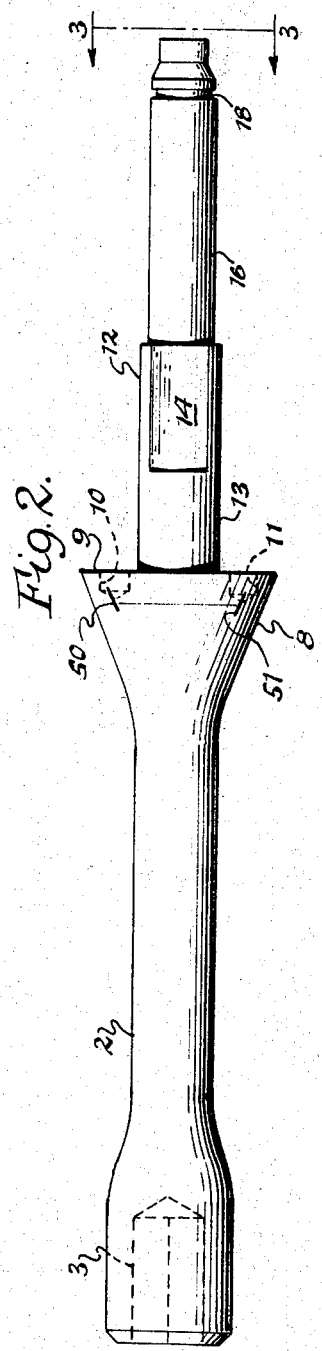
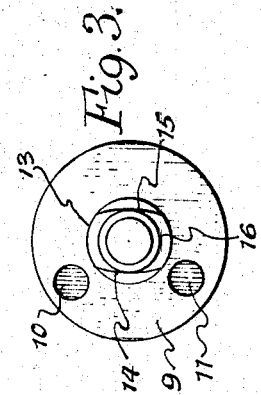
INVENTOR.
TORSTEN F. ANGQUIST
BY
*Bean & Bean*
ATTORNEYS

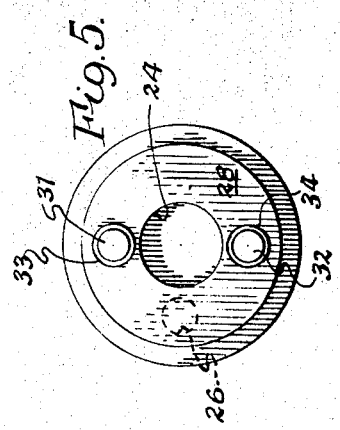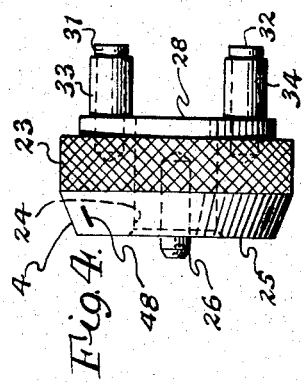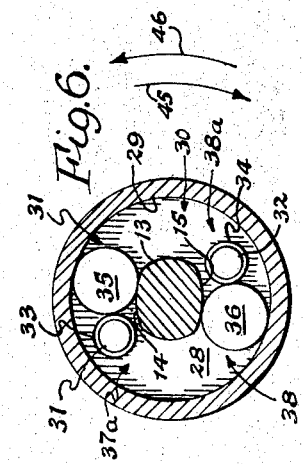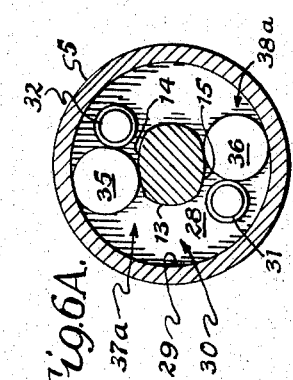

United States Patent Office 3,545,312
Patented Dec. 8, 1970

3,545,312
REVERSIBLE CAM LOCK DRIVER
Torsten F. Angquist, Jamestown, N.Y., assignor to Crescent Niagara Corporation, Buffalo, N.Y.
Filed Nov. 6, 1968, Ser. No. 773,706
Int. Cl. B25b 13/00
U.S. Cl. 81—59.1                   6 Claims

ABSTRACT OF THE DISCLOSURE

A reversible cam lock driver including a handle, a cup-shaped mounting member affixed to the handle, a tool supporting shank rotatably received within the mounting member, a plurality of wedging rollers disposed within the mounting member and adapted to lock the shank to the mounting member, and a shank mounted adjustment member having pins which serve to control positioning of the wedging rollers so as to permit reversal of the direction of driving rotation imparted by the handle to the shank.

SUMMARY OF THE INVENTION

The present invention is directed to an improved reversible cam lock driver of the type employing a plurality of wedging rollers to releasably lock a tool supporting shank for driving rotation with a manually operated handle. The driver has utility in combination with screw driving, wrench or like tools.

The invention overcomes difficulties in similar driver constructions by providing resilient sleeve like coverings for the wedging roller positioning pins of the driver, which readily deform to permit the rollers to be released from their wedging positions within nips defined by the shank and a mounting member fixed to the driver handle upon counter rotation of the handle without tending to back off a previously driven screw, nut or the like. The resilient sleeves make up for any inaccuracy in the mounting of the positioning pins, which must be sufficiently far away from the nips to permit release of the wedging rollers therefrom, but close enough to insure that the wedging rollers will be maintained in alignment therewith. Proper wedging of the rollers within the nips is insured by forming the shank with convexly shaped camming surfaces, which permit the rollers to automatically roll into their wedging positions and cooperate with the resilient sleeves to positively prevent the wedging rollers from becoming misaligned with respect to the nips.

Further, the driver of the present invention includes an arrangement for positively preventing movement of the positioning pins with respect to the shank, which ofttimes occurs in conventional driver constructions, due to possible pressure exerted on the pins by the handle via the wedging rollers during counter or non-driving rotation of the handle with respect to the shank, while the latter is positively maintained in engagement with a screw or the like. Such movement would prevent operation of the driver without readjustment after each driving rotation of the handle.

DRAWINGS

The nature and mode of operation of the driver of the present invention will be more fully understood by reference to the following description taken with the accompanying drawings wherein:

FIG. 1 is a side elevational view of the reversible cam lock driver of the present invention;
FIG. 2 is a side elevational view of the driver shank;
FIG. 3 is a sectional view taken generally along the line 3—3 in FIG. 2;
FIG. 4 is a side elevational view of the driver adjustment;
FIG. 5 is a sectional view taken generally along the line 5—5 in FIG. 4;
FIG. 6 is a sectional view taken generally along the line 6—6 in FIG. 1; and
FIG. 6a is a sectional view similar to FIG. 6, but showing the parts arranged in a reverse driving position.

DETAILED DESCRIPTION

Now referring particularly to FIG. 1, it will be seen that the driver of the present invention, which is designated as 1, generally includes a tool supporting shank portion 2, which may be provided adjacent one end thereof with a hexagonal socket 3, adapted to receive a conventional screwdriver bit or like tool having a hexagonal end shank, not shown; and adjustment member 4; a mounting member 5; and a suitable handle 6, which is provided with a bore opening 7 in which mounting member 5 is either keyed or frictionally retained for rotation with handle 6. If desired, the tool to be driven may be formed integrally with shank 2, and mounting member 5 formed integrally with handle 6.

In FIGS. 2 and 3 shank portion 2 is shown as being provided with a shoulder enlargement 8, which defines a radially extending surface 9 provided with annularly spaced adjustment recesses 10, 11, which are disposed parallel to the axis of the shank; and a stepped shank extension 12. Shank extension 12 is divided axially thereof into a cylindrical bearing portion 13, which is adapted to rotatably support adjustment member 4 and is cut away to define oppositely disposed, radially facing curved or convexly shaped cam surfaces 14, 15; and a cylindrical bearing portion 16, which is adapted to be supported for relative rotation and axial reciprocation within mounting member bore opening 17. Bearing portion 16 is provided adjacent the free end thereof with an annular slot 18, which is adapted to receive a split locking ring 19, shown only in FIG. 1.

As best shown in FIG. 1, split locking ring 19, is employed to prevent removal of shank bearing portion 16 from within mounting member bore opening 17. Suitable means, such as a coil compression spring 20, supported within mounting member bore enlargement 21, is adapted to bear against locking ring 19 in order to space the locking ring from the end of the mounting member 5 and maintain the parts of the driver biased into normal surface to surface engagement, as indicated in FIG. 1.

Adjustment member 4 is best shown in FIGS. 4 and 5 as having a knurled peripheral surface portion 23 to facilitate grasping thereof by an operator of the driver and a through bore opening 24 to freely receive shank bearing portion 13. One end of member 4 is provided with a radially extending surface 25 having a projecting adjustment pin 26, which is adapted to be selectively positioned within one of recesses 10, 11 by rotating member 4 with respect to shank enlargement 8, when the shank is manually extended or moved to the left, as viewed in FIG. 1, as against the return bias of spring 20. The oppositely facing end of adjustment member 4 is provided with a reduced diameter portion 28, which is adapted to be freely received within bore enlargement 29 of mounting member 5 and cooperate therewith to define a cavity generally designated at 30 in which shank cam surfaces 14, 15 are adapted to be disposed. Reduced diameter portion 28 is provided with a pair of projecting positioning pins or obstructions 31, 32, which are disposed parallel to the axis of shank 2 and covered by sleeves 33, 34, respectively. Sleeves 33, 34 may be of any suitable resilient, elastic material and may be tubes frictionally fitted onto the pins or formed directly on the pins by a molding operation. Alternatively, sleeves 33, 34 may be coil springs loosely carried by the pins.

It will be understood by viewing FIGS. 6 and 6a that pins 31, 32 are adapted to be received within cavity 30 and function to maintain a pair of wedging rollers 35, 36 adjacent either of nips 37, 37a or 38, 38a, which are defined by the cylindrical inner surface of mounting member bore enlargement 29 and shank cam surfaces 14, 15 depending upon the positioning of adjustment pin 26, wherein rollers 35, 36 may effectively lock shank 2 for driving rotation with mounting member 5 and handle 6. Shank cam surfaces 14, 15 are preferably curved or convex, so as to permit rollers 35, 36 to "roll into" the nips, as is best shown in FIGS. 6, 6a, and thus achieve a more positive wedging or locking action than would be possible if such cam surfaces were flat. Also, by curving surfaces 14, 15, the axes of rollers 35, 36 are effectively prevented from becoming misaligned with respect to the nips.

When pins 31, 32 are positioned as indicated in FIG. 6, and handle 6 is rotated in the direction indicated by arrow 45, rollers 35, 36 are received within nips 37, 38, respectively, and serve to lock shaft 2 for rotation in the same direction. However, when handle 6 is counter rotated or rotated in an opposite direction, as indicated by arrow 46, resilient sleeves 33, 34 are deformed to permit rollers 35, 36 to move out of nips 37, 38 but obstructs or prevents them from moving across camming surfaces 14, 15 into wedging engagement within nips 37a, 38a. This permits free rotation of handle 6 and mounting member 5 with respect to adjustment member 4 and shank 2, which are maintained stationary by engagement of the tool carried by the shank with the work, such as a screw, being driven. Possible movement of positioning pins 31, 32 with respect to shank 2, due to pressure exerted on the pins by handle 6 via rollers 35, 36 during counter rotation thereof, is positively prevented, since pressure applied to the handle in addition to spring 20 serves to maintain adjustment pin 26 within either of recesses 10, 11.

The arrangement of parts illustrated in FIG. 6 would occur when adjustment pin 26 is received within recess 10, whereas the arrangement of parts indicated in FIG. 6a would occur when adjustment member 4 is rotated relative to shank 2 so as to position pin 26 within recess 11. Thus, in FIG. 6 the parts are locked for normal driving of work, such as a screw, whereas in FIG. 6a the parts are locked for screw removal.

Adjustment of driver 1 may be facilitated by providing indicia, such as line 48 on adjustment 4 to indicate the position of adjustment pin 26 and a pair of lines 50, 51 on shank enlargement 8 to indicate the positioning of recesses 10, 11, respectively.

While only the preferred embodiment of the present invention has been described in detail, it will be understood that variations thereof may be made without departing from the intended scope of the present invention. In this respect it will be understood that the shank and mounting member may be locked for rotation by any desired number of wedging rollers, provided there is included a corresponding number of camming surfaces on the shank extension and positioning pins or obstructions on the adjustment member. Accordingly, it is wished that protection on the driver of the present invention be limited only by the scope of the appended claims.

I claim:
1. A reversible cam lock driver including
a handle;
a mounting member non-movably carried on said handle, said mounting member having a bore opening terminating in a bore enlargement which defines a cylindrical surface;
a tool supporting shank, said shank having a shoulder enlargement and a shank extension, said shank extension being mounted within said bore opening of said mounting member for both rotational and axial reciprocating movement relative thereto, said shank extension having radially, outwardly facing cam surface means thereon;
an adjustment member rotatably supported on said shank extension intermediate said shank enlargement and said mounting member and cooperating with said mounting member bore enlargement to define a cavity enclosing said cam surface means, said adjustment member carrying pin means projecting into said cavity, said adjustment member and said shoulder enlargement having cooperating pin and recess means adapted when engaged to lock said adjustment member for rotation with said shank and to position said pin means in alternate driver locking positions relative to said cam surface means;
wedging roller means disposed within said cavity intermediate said cam surface means and said cylindrical surface and being adapted to cooperate therewith to wedgingly lock said shank to said mounting member for rotation with said handle, said pin means when in one of said locking positions preventing said roller means from locking said shank to said mounting member when said handle is moved in one direction and when in another of said locking positions preventing said roller means from locking said shank to said mounting member when said handle is moved in an opposite direction;
spring means tending to normally bias said shank enlargement and said mounting member into abutting engagement with said adjustment member, whereby said pin and recess means are disposed in engagement to position said pin means in one of said locking positions, said spring means being compressible to permit said shoulder enlargement to be manually moved axially away from said adjustment member to disengage said pin and recess means whereafter said adjustment means may be manually rotated with respect to said shank enlargement so as to permit said spring means to reengage said pin and recess means and to position said pin means in another of said locking positions.

2. A driver according to claim 1, wherein there is provided two each of said cam surface means, pin means and wedging roller means, and said pin means alternate with said roller means about said shaft extension.

3. A driver according to claim 1, wherein said pin and recess means includes a pin carried on said adjustment member and a pair of annularly spaced recesses disposed in said shoulder enlargement, said pin and recesses being disposed parallel to the axis of said shank.

4. A driver according to claim 1, wherein said cam surface means and said cylindrical surface define nips in which said roller means is adapted to be alternatively wedged to effect locking of said shank for rotation with said mounting member when said handle is rotated in opposite driving directions, and said pin means includes resilient sleeve covering means, said pin means when in said locking positions being arranged such that said sleeve means is deformed by said roller means upon movement thereof from said nips when said handle is rotated in opposite non-driving directions.

5. A driver according to claim 4, wherein said cam surface means is curved to present a convex cam surface to said cylindrical surface.

6. A driver according to claim 1, wherein said cam surface means and said cylindrical surface define a pair of adjacent nips in which said roller means is adapted to be alternatively wedged to effect locking of said shank for rotation with said mounting member when said handle is rotated in opposite driving directions, said cam surface means being curved to present a convex cam surface to said cylindrical surface.

References Cited

UNITED STATES PATENTS

| | | | |
|---|---|---|---|
| 1,878,053 | 9/1932 | Winger | 81—59.1X |
| 2,685,355 | 8/1954 | Stone | 192—44 |
| 2,410,392 | 10/1946 | Rich | 192—44 |

JAMES L. JONES, Jr., Primary Examiner

U.S. Cl. X.R.

192—44